(12) United States Patent
Liu (10) Patent No.: US 7,945,267 B2
(45) Date of Patent: May 17, 2011

(54) METHOD, APPARATUS AND SYSTEM FOR BEARING VOICE DATA

(75) Inventor: Qingshun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 620 days.

(21) Appl. No.: 12/054,653

(22) Filed: Mar. 25, 2008

(65) Prior Publication Data
US 2008/0166983 A1    Jul. 10, 2008

Related U.S. Application Data

(63) Continuation of application No. PCT/CN2007/070030, filed on May 18, 2007.

(30) Foreign Application Priority Data

Sep. 30, 2006 (CN) .......................... 2006 1 0159675

(51) Int. Cl.
*H04W 40/00* (2009.01)
(52) U.S. Cl. ...................... 455/445; 455/422.1; 455/436
(58) Field of Classification Search .................... None
See application file for complete search history.

(56) References Cited

U.S. PATENT DOCUMENTS

| | | | | |
|---|---|---|---|---|
| 7,808,920 B2 * | 10/2010 | El-Maleh et al. | ............. | 370/252 |
| 2002/0029142 A1 * | 3/2002 | Koo | ............... | 704/221 |
| 2002/0054571 A1 * | 5/2002 | Falsafi | ........................ | 370/252 |
| 2003/0195006 A1 * | 10/2003 | Choong et al. | ................ | 455/450 |
| 2005/0083910 A1 * | 4/2005 | Hallin et al. | .................... | 370/352 |
| 2005/0124299 A1 * | 6/2005 | Scribano et al. | ................ | 455/68 |
| 2007/0140293 A1 * | 6/2007 | Agarwal et al. | ................ | 370/466 |
| 2007/0213077 A1 * | 9/2007 | Mian et al. | ..................... | 455/466 |
| 2008/0081648 A1 * | 4/2008 | Kang et al. | ..................... | 455/500 |
| 2009/0209255 A1 * | 8/2009 | Lassers et al. | ................ | 455/436 |
| 2009/0281799 A1 * | 11/2009 | El-Maleh et al. | ............. | 704/221 |

FOREIGN PATENT DOCUMENTS

| | | |
|---|---|---|
| CN | 1476191 A | 2/2004 |
| CN | 1533107 A | 9/2004 |
| CN | 1567775 | 1/2005 |

(Continued)

OTHER PUBLICATIONS

"$3^{rd}$ Generation Partnership Project 2; Interoperability Specification (IOS) for cdma2000 Access Network Interfaces—Part 1 Overview; (3G-IOS v5.0)," 3GPP2 A.S0011-C, Verison 1.0, Feb. 2005, 28 pages, 3GPP2 Organizational Partners.

(Continued)

*Primary Examiner* — Ajit Patel
(74) *Attorney, Agent, or Firm* — Slater & Matsil, L.L.P.

(57) ABSTRACT

A method for bearing voice data includes: a) a calling MSCe and the called MSCe determining that a calling MS and a called MS support the same voice coding and decoding type and that a call is a point-to-point call; b) the calling MSCe and the called MSCe sending Bearer Update Requests to the calling BSC and the called BSC, respectively; and c) the calling BSC and the called BSC setting up a voice bearer path between the calling MS and the called MS according to the requests from the MSCes. As a result, transparent transmission of voice data in a MGW is avoided so that transmission delay can be reduced and additional loading of the MGW can be avoided.

19 Claims, 4 Drawing Sheets

FOREIGN PATENT DOCUMENTS

| | | |
|---|---|---|
| CN | 1585386 | 2/2005 |
| CN | 1767510 A | 5/2006 |
| CN | 1870772 | 11/2006 |
| CN | 1870824 | 11/2006 |
| CN | 1874544 | 12/2006 |
| KR | 20050007991 | 1/2005 |
| WO | WO 99/31911 A1 | 6/1999 |
| WO | 2005006677 | 1/2005 |

OTHER PUBLICATIONS

"3$^{rd}$ Generation Partnership Project 2; Interoperability Specification (IOS) for cdma2000 Access Network Interfaces—Part 2 Transport; (3G-IOS v5.0)," 3GPP2 A.S0012-C, Version 1.0, Feb. 2005, 74 pages, 3GPP2 Organizational Partners.

"3$^{rd}$ Generation Partnership Project 2; Interoperability Specification (IOS) for cdma2000 Access Network Interfaces—Part 3 Features; (3G-IOS v5.0)," 3GPP2 A.S0013-C, Version 1.0, Feb. 2005, 374 pages, 3GPP2 Organizational Partners.

"3$^{rd}$ Generation Partnership Project 2; Interoperability Specification (IOS) for cdma2000 Access Network Interfaces—Part 4(A1, A1p, A2, and A5 Interfaces); (3G-IOS v5.0)," 3GPP2 A.S0014-C, Version 1.0, Feb. 2005, 480 pages, 3GPP2 Organizational Partners.

"3$^{rd}$ Generation Partnership Project 2; Interoperability Specification (IOS) for cdma2000 Access Network Interfaces—Part 5 (A3 and A7 Interfaces); (3G-IOS v5.0)," 3GPP2 A.S0015-C, Version 1.0, Feb. 2005, 254 pages, 3GPP2 Organizational Partners.

Written Opinion of the International Searching Authority, International Application No. PCT/CN2007/070030, Applicant: Huawei Technologies Co., Ltd., et al., Date of mailing: Aug. 23, 2007, 12 pages.

\* cited by examiner

METHOD, APPARATUS AND SYSTEM FOR BEARING VOICE DATA

CROSS REFERENCE TO RELATED APPLICATIONS

This application is a continuation of International Patent Application No. PCT/CN2007/070030, filed on May 18, 2007, which claims priority from Chinese Patent Application No. 200610159675.6, filed on Sep. 30, 2006, each of which is hereby incorporated by reference in its entirety herein.

FIELD OF THE INVENTION

The present invention relates to voice bearing technology in a wireless communication system, and in particular to a method, apparatus, and system for bearing voice data.

BACKGROUND OF THE INVENTION

In a wireless communication system, an A interface provides an interface between a radio access network and a core network. A base station controller (BSC) communicates with mobile switching center (MSC) through an A1 interface or an A2 interface of the A interface. The A1 interface is a signaling interface used to transmit signaling information between the BSC and the MSC, and the A2 interface is the service interface used to transmit voice information between the BSC and the MSC.

IP transformation is a current trend in network development. The A interface over IP is defined in the Interoperability Specification (IOS) 5.0 of the Third Generation Partnership Project 2 (3GPP2).

Figure 1:
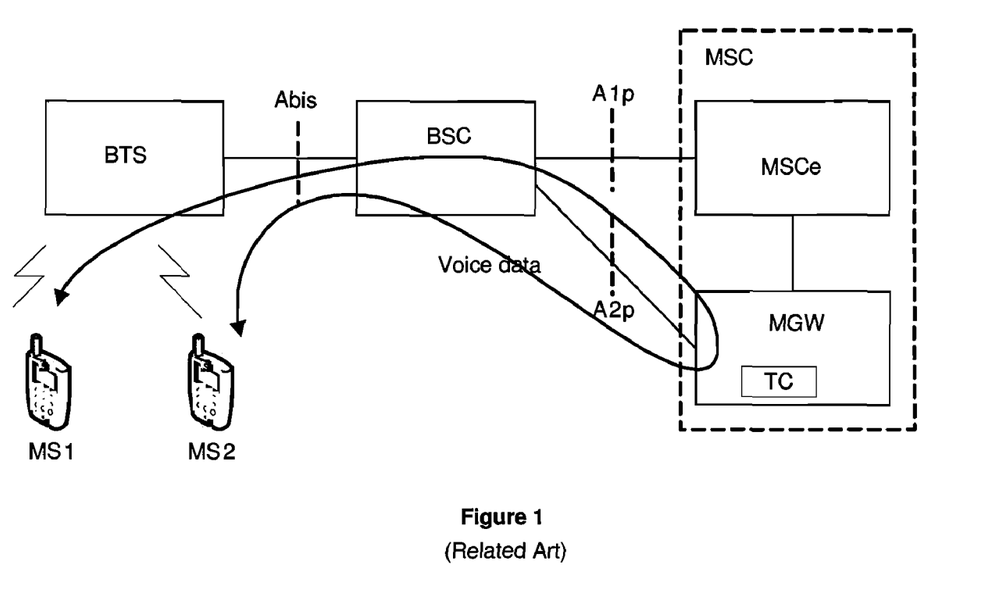
FIG. 1 shows the reference model of the A interface over IP in a wireless communication system.

FIG. 1 shows the reference model of the A interface over IP in a prior wireless communication system. As shown in FIG. 1, the MSC is divided into an MSC Emulation (MSCe) and a media gateway (MGW) based on the principle of separating bearer and control in the core network, and defines the A interface over IP as the A1p/A2p interface in IOS 5.0.

The MSCe fulfills the function of a control plane and the A1p interface is the interface between the BSC and the MSCe.

The MGW fulfills the function of a service plane, and the A2p interface is the interface between the BSC and the MGW.

Figure 2:
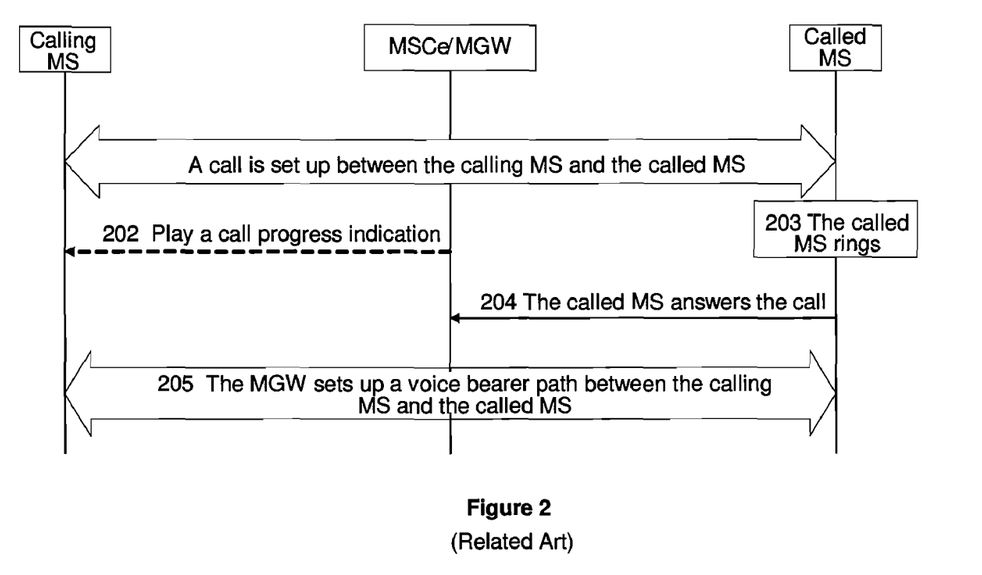
FIG. 2 shows the signaling flow between the calling MS and the called MS during a call in the system shown in FIG. 1.

FIG. 2 shows the signaling flow between a calling mobile station (MS) and a called MS during a call in the system shown in FIG. 1. The dashed line in FIG. 2 indicates the flow of service information, and the solid lines indicate the flow of control information. The flow as illustrated includes the following steps.

Step 201: The calling MS and called MS set up a call connection based on the flow specified by the IOS.

Step 202: The MGW plays a call progress indication to the calling MS.

Step 203: The called MS rings.

Step 204: The called MS answers the call and sends a response message to MSCe.

Step 205: The MSCe notifies the MGW to set up a voice path between the calling MS and the called MS after receiving the response message. The calling MS then communicates with the called MS.

In this step, because a transcoder (TC) is moved to the MGW from the BSC after the A interface is enabled over IP, the BSC encapsulates received voice data according, for example, to the Real-Time Transport Protocol (RTP), and sends the data to the MGW through the A2p interface. The MGW then sends the voice data processed by the TC to terminal through the corresponding BSC. If the calling MS and the called MS support the same voice coding and decoding types, the MGW can send the voice data directly to the BSC, as indicated by the arrow in FIG. 1. In this case, the TC need not process voice data between the called MS and the calling MS such as rate matching and code conversion. In this case, voice data is transparently transmitted in the MGW.

Analyzing, by the inventor of the application, the above method for transmitting voice data revealed that when the calling MS and the called MS support the same voice coding and decoding type, no processing of voice data is needed in the MGW, but the transparent transmission of the voice data in the MGW adds to the transmission delay of the voice data and wastes the processing capability of the MGW.

SUMMARY OF THE INVENTION

The embodiments of the present invention described herein provide a method for bearing voice data so that the transmission delay can be reduced and that the load of the MGW can be mitigated.

The embodiments of the present invention also provide a system for bearing voice data so that the transmission delay can be reduced and that the load of the MGW can be mitigated.

The embodiments of the present invention further provide an MSCe so that the transmission delay can be reduced and that the load of the MGW can be mitigated.

The embodiments of the present invention provide a method for bearing voice data, including:

a) the calling MSCe and the called MSCe determine that the calling MS and the called MS support the same voice coding and decoding type and that the call between the calling MS and the called MS is a point-to-point call;

b) the calling MSCe and the called MSCe each send a Bearer Update Request to the calling BSC and the called BSC respectively; and c) the calling BSC and the called BSC set up a voice bearer path between the calling MS and the called MS according to the requests from the calling MSCe and the called MSCe.

The embodiments of the present invention described herein also provide a system for bearing voice data, including a calling BSC, a calling MSCe, a called BSC, and a called MSCe, wherein:

a) the calling MSCe and the called MSCe are configured to judge whether the calling MS and the called MS support the same voice coding and decoding type and whether the call is a point-to-point call, and to send a Bearer Update Request to the calling BSC and the called BSC respectively; and b) the calling BSC and the called BSC are configured to set up a voice bearer path between the calling MS and the called MS according to the requests from the calling MSCe and the called MSCe.

The embodiments of the present invention described herein provide an MSCe, including a judgment module and a communication module, wherein:

a) the judgment module is configured to judge whether the calling MS and the called MS support the same voice coding and decoding type and whether the call is a point-to-point call, and to notify the communication module of the judgment result; and b) the communication module is configured to send a Bearer Update Request to the BSC according to the notification from the judgment module.

In the technical solution provided in the embodiments of the present invention described herein, after the called MS answers the call from the calling MS, the calling MSCe and the called MSCe respectively judge whether the calling MS and the called MS support the same voice coding and decoding type, and whether the call is a point-to-point call. If the calling MS and the called MS support the same voice coding and decoding type and the call is a point-to-point call, the calling MSCe and the called MSCe each send a Bearer Update Request to the calling BSC and the called BSC respectively; then the calling BSC and the called BSC set up a voice bearer path between the calling MS and the called MS accordingly. The transparent transmission of voice data in the MGW is avoided. Hence, the transmission delay of voice data is reduced and the load of the MGW is mitigated.

BRIEF DESCRIPTION OF THE DRAWINGS

The invention will become more readily apparent from the Detailed Description of the Invention, which proceeds with reference to the following drawings, in which.

DETAILED DESCRIPTION OF THE INVENTION

The present invention is hereinafter described in detail with reference to the embodiments and accompanying drawings.

In the technical solution provided in the embodiments of the present invention, if a calling MS and a called MS support the same voice coding and decoding type, and a call between the calling MS and the called MS is a point-to-point call, a voice bearer path is set up between the calling BSC and the called BSC.

The BSC does not have resources for functions such as tone playing and number receiving, and cannot play call progress indications such as ring back tone. Therefore, in the embodiments of the present invention, functions such as tone playing and number receiving are fulfilled by the MGW. Before the called MS answers the call, a voice bearer path is set up between the BSC and the MGW. After the called MS answers the call, if calling MSCe and called MSCe determine that the calling MS and the called MS support the same voice coding and decoding type and that the call between the calling MS and the called MS is a point-to-point call, each MSCe sends a Bearer Update Request to its corresponding BSC, which sets up a voice bearer path between the calling MS and the called MS. The voice data is transmitted between the two BSCs instead of between the BSC and the MGW. In this way, the transparent transmission of the voice data in the MGW is avoided.

In the above technical solution, the following methods may be used to judge whether the calling MS and the called MS support the same voice coding and decoding type:

method 1: Judge whether there are voice coding and decoding types supported by both the calling MS and the called MS;

method 2: Judge whether there are voice coding and decoding types supported by both the calling MS and the called MGW;

method 3: Judge whether there are voice coding and decoding types supported by both the calling MGW and the called MS; and method 4: Judge whether there are voice coding and decoding types supported by both the calling MGW and the called MGW.

In the technical solution provided in the embodiments of the present invention, the calling BSC and the called BSC may or may not be the same. If the calling BSC and the called BSC are not the same, an IP connection between the two BSCs is needed to implement the technical solution provided in the embodiments of the present invention described herein.

Further, the calling MSCe and the called MSCe may or may not be the same. If the calling MSCe and the called MSCe are not the same, the calling MSCe and the called MSCe respectively judge whether the voice data between the calling MS and the called MS needs to be processed by the TC in local MGW, and whether the call between the calling MS and the called MS is a point-to-point call. After that, the calling MSCe and the called MSCe each send a Bearer Update Request to the calling BSC and the called BSC respectively.

Figure 3:
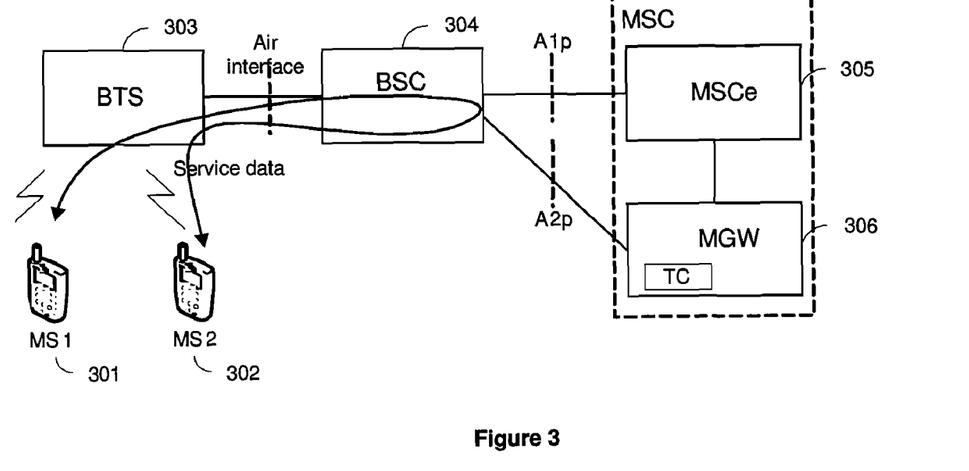
FIG. 3 shows the structure of a system for bearing voice data in an embodiment of the present invention.

FIG. 3 shows the structure of a system for bearing voice data according to an embodiment of the present invention. In this embodiment, it is assumed that the calling MS and the called MS are under the same MSCe, MGW, BSC, and base transceiver station (BTS). The system shown in FIG. 3 includes calling MS 301, called MS 302, BTS 303, BSC 304, MSCe 305, and MGW 306.

MSCe 305 is configured to judge whether the calling MS and the called MS support the same voice coding and decoding type, and whether the call between the calling MS and the called MS is a point-to-point call. If the calling MS and the called MS support the same voice coding and decoding type and the call is a point-to-point call, MSCe 305 is configured to send a notification to the BSC. For example, MSCe 305 may send a Bearer Update Request to BSC 304 so that MGW 306 no longer forwards voice data between the calling MS and the called MS. Instead, the BSC 304 may bear the voice data between the calling MS and the called MS.

BSC 304 is configured to set up a voice bearer path between the calling MS and the called MS upon receiving the notification (for example, the Bearer Update Request, from MSCe 305) and to send a response to the MSCe 305. BSC 304 is also configured to bear the voice data between the calling MS and the called MS and the call progress indication such as ring back tone played before MS 302 answers the call from MS 301.

MGW 306 is configured to fulfill functions such as tone playing and number receiving, and to play a call progress indication such as ring back tone before MS 302 answers the call from MS 301.

MSCe 305 in the system shown in FIG. 3 includes a judgment module (not shown) and a communication module (not shown).

The judgment module is configured to judge whether the calling MS and the called MS support the same voice coding and decoding type, and whether the call between the calling MS and the called MS is a point-to-point call. If the calling MS and the called MS support the same voice coding and decoding type and the call between the calling MS and the called MS is a point-to-point call, the judgment module is configured to send a notification to the communication module.

The communication module is then configured to send a Bearer Update Request to the BSC according to the notification from the judgment module.

The communication module is also configured to send Bearer Update Requests to the BSC and to receive responses from the BSC.

MSCe 305 further includes a BSC information exchange module (not shown), which is configured to exchange BSC information with another MSCe through the communication module.

The technical solution provided in the embodiments of the present invention may also be implemented in an inter-BSC hard handoff of the calling MS or the called MS.

Based on the system in FIG. 3, the following describes a detailed implementation of the embodiments of the present invention in the process of a voice call. In signaling flowcharts provided for three examples of the present invention, dashed lines and solid lines indicate service information and control information respectively.

Example 1

Figure 4:
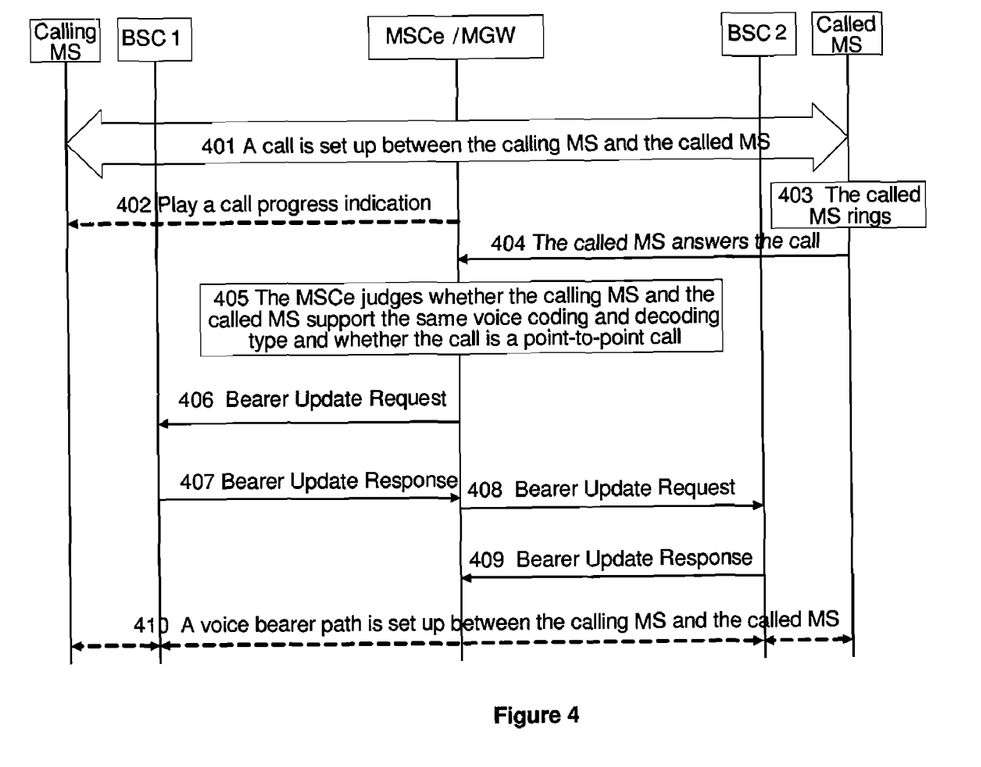
FIG. 4 shows the signaling flow of a call between the calling MS and the called MS in embodiment 1 of the present invention.

FIG. 4 shows the signaling flow of a voice call in example 1 of the present invention. In this example, the calling BSC and the called BSC are not the same, but the calling MSCe and the called MSCe are the same. BSC1 and BSC2, joined by an IP connection in between, are the calling BSC and the called BSC respectively. The flow illustrated by FIG. 4 includes the following steps:

Step 401: The calling MS and the called MS set up a call based on the flow specified by IOS 5.0.

The originated call message sent by the calling MS and a paging response message sent by the called MS contain the voice coding and decoding types supported by the calling MS and the called MS respectively. In this step, the voice coding and decoding types are recorded by the MSCe.

Step 402: The MGW plays a call progress indication to the calling MS.

Step 403: The called MS rings.

Step 404: The called MS answers the call and sends a response message to the MSCe.

Step 405: After receiving the response message from the called MS, the MSCe judges whether the calling MS and the called MS support the same voice coding and decoding voice type and whether the call is a point-to-point call. If the calling MS and the called MS support the same voice coding and decoding type and the calling is a point-to-point call, the MSCe executes step 406; otherwise, a voice path is set up between the calling MS and the called MS as shown in step 205 of FIG. 2 and the flow ends.

In this step, the MSCe judges whether the calling MS and the called MS support the same voice coding and decoding type based on the supported voice coding and decoding types recorded in step 401. The MSCe also determines that the call is a point-to-point call instead of a three-party call or a conference call. If the calling MS and the called MS support the same voice coding and decoding type and the call is a point-to-point call, the MSCe executes step 406.

The method for judging whether the calling MS and the called MS support the same voice coding and decoding type and whether the call is a point-to-point call is omitted here.

Step 406: The MSCe sends to BSC1 a Bearer Update Request, which contains the IP address of BSC2 and the User Datagram Protocol (UDP) port number of BSC2.

In this step, the MSCe requests BSC1 to change the destination IP address and UDP port number of the voice bearer path of BSC1 to the IP address and UDP port number of BSC2.

Step 407: BSC1 updates the voice bearer path between the calling MS and the called MS based on the request of the MSCe, and returns a Bearer Update Response to the MSCe.

Step 408: The MSCe sends to BSC2 a Bearer Update Request, which contains the IP address and UDP port number of BSC1.

In this step, the MSCe requests BSC2 to change the destination IP address and UDP port number of the voice bearer path of BSC2 to the IP address and UDP port number of BSC1.

Step 409: BSC2 updates the voice bearer path between the calling MS and the called MS based on the request of the MSCe and returns a Bearer Update Response to the MSCe.

A voice bearer path between the calling MS and the called MS is set up between BSC1 and BSC2.

Step 410: A voice path is set up between the calling MS and the called MS for a conversation.

Thereafter, the signaling flow of a voice call between the calling MS and the called MS in example 1 ends.

In the signaling flow shown in FIG. 4, step 408 and step 409 may alternatively be executed before or simultaneously with step 406 and step 407.

In the embodiment shown in FIG. 4, after the bearer is updated in steps 406 to 409, a new voice bearer path between the calling MS and the called MS is set up between the calling BSC and the called BSC. With transparent transmission in the MGW avoided, transmission delay is reduced, and added loading of the MGW is avoided.

The calling MSCe and the called MSCe are the same in embodiment 1. In actual practice, the technical solution provided in the embodiments of the present invention may apply to networks where the calling MSCe and the called MSCe are not the same. Embodiment 2 describes this case in detail.

Example 2

Figure 5:
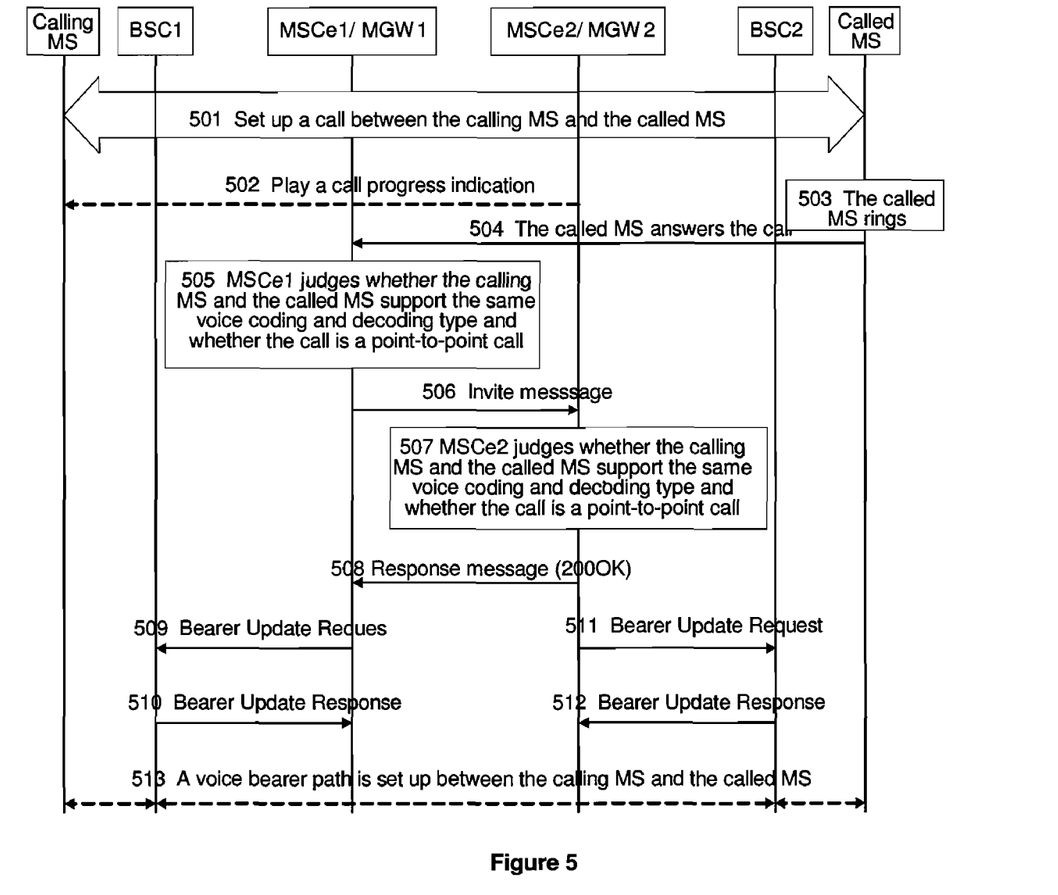
FIG. 5 shows the signaling flow of a call between the calling MS and the called MS in embodiment 2 of the present invention.

FIG. 5 shows the signaling flow of a voice call in example 2 of the present invention. In this example, the calling BSC and the called BSC are not the same, the calling MSCe and the called MSCe are not the same. As a result, the calling MS and the called MS are associated with different MSCes and BSCs. BSC1 and BSC2, joined by an IP connection in between, are the calling BSC and the called BSC respectively. In this example, MSCe1/MGW1 is the calling MSCe/MGW, and MSCe2/MGW2 is the called MSCe/MGW. The method illustrated by FIG. 5 includes the following steps:

Steps 501 to 505 are similar to steps 401 to Step 405 in FIG. 4. The calling MS and the called MS set up a call based on the flow specified by the IOS. In the process, MSCe1 records the voice coding and decoding types supported by the calling MS and obtains, and records the voice coding and decoding types supported by the called MS or the called MGW from MSCe2. MSCe2 records the voice coding and decoding types supported by the called MS, and obtains and records the voice coding and decoding types supported by the calling MS from MSCe1.

After the called MS answers the call, MSCe1 judges whether both the calling MS and the called MGW or both the calling MS and the called MS support the same voice coding and decoding type according to the records and whether the call between the calling MS and the called MS is a point-to-point call.

If the calling MS and the called MS support the same voice coding and decoding type and the call is a point-to-point call, MSCe1 executes step 506; otherwise, a voice path is set up between the calling MS and the called MS as in step 205 of FIG. 2 and the flow ends.

Step 506: MSCe1 sends to MSCe2 an INVITE message, which contains the IP address and UDP port number of BSC1.

In this step, MSCe1 and MSCe2 exchange the IP address and UDP port number of the local BSC based, for example, on the Session Initiation Protocol (SIP).

Step 507: MSCe2 judges whether the calling MS and the called MS support the same voice coding and decoding voice type, that is, whether the TC in the called MGW needs to process the voice coding and decoding data between the calling MS and the called MS, and whether the call is a point-to-point call.

In this step, MSCe2 judges whether the calling MS and the called MS support the same voice coding and decoding type based on the recorded voice coding and decoding types.

Step 508: MSCe2 returns a response message (200 OK) to MSCe1 based on the judgment in step 507.

In this step, MSCe2 determines the information to be contained in the response message according to whether the TC needs to process the voice data and whether the call is a point-to-point call.

If the voice data needs to be processed by the TC in MGW2 or the call is not a point-to-point call, the 200 OK message returned to MSCe1 contains the IP address and UDP port number of MGW2, and a voice bearer path is set up between the calling BSC and the called MGW for the calling MS and the called MS.

If the voice data does not need to be processed by the TC in MGW2 and the call is a point-to-point call, the 200 OK message returned to MSCe1 contains the IP address and UDP port number of BSC2, and a voice bearer path is set up between the calling BSC and the called BSC.

Steps 509 to 512 are similar to steps 406 to 409 in FIG. 4. MSCe1 and MSCe2 send a Bearer Update Request to BSC1 and BSC2 respectively.

The Bearer Update Request message MSCe1 sends to BSC1 carries the IP address and UDP port number that are contained in the 200 OK message MSCe1 receives in step 508. The Bearer Update Request message MSCe2 sends to BSC2 carries the IP address and UDP port number that are contained in the INVITE message MSCe2 receives in step 506. After setting up a new voice bearer path according to the requests from MSCe1 and MSCe2, BSC1 and BSC2 send a Bearer Update Response to MSCe1 and MSCe2 respectively.

Step 513: A voice bearer path is set up between the calling MS and the called MS for a conversation.

Thereafter, the signaling flow of a voice call between the calling MS and the called MS in example 2 ends.

In the signaling flow shown in FIG. 5, step 511 and step 512 may alternatively be executed before or simultaneously with step 509 and step 510.

In the foregoing example, if the calling MSCe and the called MSCe are not the same, the two MSCes respectively judge whether the voice coding and decoding data of the calling MS or the called MS needs to be processed by the TC in the local MGW, that is, whether the local MGW is unnecessary on the voice bearer link. Then the calling MSCe and the called MSCe send a Bearer Update Request to the calling BSC and the called BSC respectively. If the voice coding and decoding data does not need to be processed by the TCs in both MGWs, a voice bearer path is set up between the calling BSC and the called BSC for the calling MS and the called MS according to the method provided in the embodiments of the present invention. If transparent transmission in the MGW is done at one MGW and TC processing is needed at the other MGW, a voice bearer path is set up between the BSC at the transparent transmission MGW side and the MGW in which the TC processes the voice coding and decoding data. The transparent transmission of the voice coding and decoding data in the MGW is avoided. Thus, transmission delay is reduced and added loading of the MGW is avoided.

In example 1 and example 2, the serving BSC of the calling MS and the called MS doesn't change. In actual practice, an inter-BSC hard handoff of the calling MS or the called MS is possible because of the mobility of users. Example 3 describes the implementation of the technical solution provided in the embodiments of the present invention in this case.

Example 3

Figure 6:
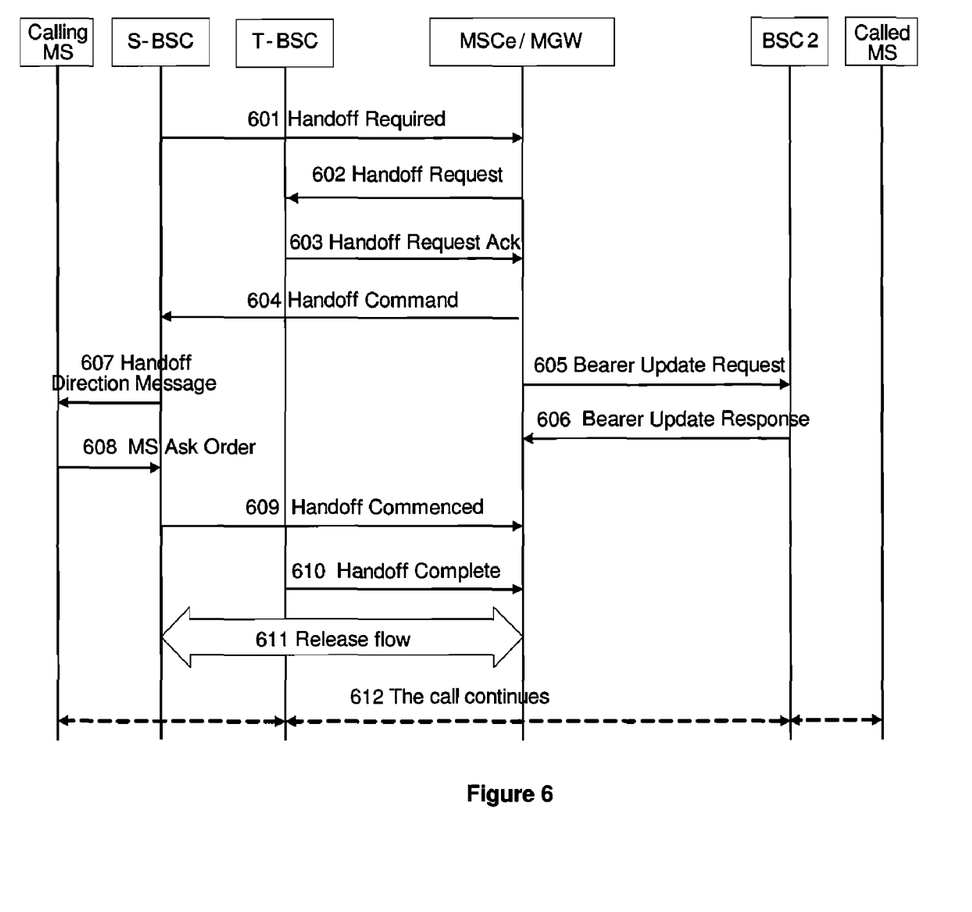
FIG. 6 shows the signaling flow of an inter-BSC hard handoff of the calling MS in embodiment 3 of the present invention.

FIG. 6 shows the signaling flow of an inter-BSC hard handoff of the calling MS in example 3. S-BSC and T-BSC are the source BSC and target BSC of the calling MS for the hard handoff, respectively. BSC2 is the called BSC, connected over IP to the S-BSC and the T-BSC. In this example, the voice bearer path has been updated following the method shown in FIG. 4 and there is an ongoing voice bearer path between the S-BSC and BSC2. A hard handoff is performed according to the flow in FIG. 6 if the S-BSC determines that an inter-BSC hard handoff is required. The method includes the following steps:

Step 601: The S-BSC sends to MSCe a Handoff Required message carrying related target cell information of the T-BSC.

Step 602: The MSCe locates the T-BSC according to the target cell information in the Handoff required message and sends a Handoff Request to the T-BSC to request resources of air interface and terrestrial links. The request also carries the IP address and UDP port number of BSC2.

In this step, the MSCe sends a Handoff Request to the T-BSC according to the standard handoff flow. The IP address and UDP port number in the request are the IP address and UDP port number of BSC2 instead of the IP address and UDP port number of the MGW. The voice data from T-BSC is sent to BSC2 without transparent transmission in the MGW because the destination IP address and UDP port number of the voice bearer path of T-BSC are the IP address and UDP port number of BSC2.

Step 603: The T-BSC returns to the MSCe a Handoff Request Ack, which carries its own IP address and UDP port number.

Step 604: The MSCe sends to S-BSC a Handoff Command to notify S-BSC of performing the hard handoff.

Step 605: The MSCe sends to BSC2 a Bearer Update Request, which contains the IP address and UDP port number of the T-BSC.

In this step, the MSCe requests BSC2 to change the destination IP address and UDP port number of the voice bearer path of BSC2 to the IP address and UDP port number of the T-BSC.

Step 606: BSC2 updates the voice bearer path between the calling MS and the called MS based on the request of the MSCe and returns a Bearer Update Response to the MSCe.

Step 607: After receiving the Handoff Command from the MSCe, the S-BSC sends a Handoff Direction message to the MS to notify the MS of performing the hard handoff.

Step 608: The MS returns an MS Ack Order message to the S-BSC in response to the Handoff Direction message.

Step 609: The S-BSC sends to the MSCe a Handoff Commenced message, indicating that the hard handoff is ongoing.

Step 610: After the MS is handed off to the T-BSC, the T-BSC sends a Handoff Complete message to the MSCe.

A voice bearer path between the calling MS and the called MS is set then up between the T-BSC and the BSC2.

Step 611: The release procedure between the MSCe and S-BSC is performed and resources of S-BSC are released.

Step 612: The call between the calling MS and the called MS continues.

Thereafter, the signaling flow of a voice call between the calling MS and the called MS in example 3 ends.

The handoff between the S-BSC and the T-BSC in FIG. 6 follows the standard handoff flow. The difference lies mainly in step 602, in which the IP address and UDP port number in the Handoff Request sent by the MSCe to the T-BSC are the IP address and UDP port number of BSC2 instead of the IP address and UDP port number of the MGW. Another difference is that when the MSCe sends a Handoff Command to the S-BSC, it also sends to BSC2 a Bearer Update Request, which carries the IP address and UDP port number of the T-BSC, to request BSC2 to change the destination IP address and port number. In this way, a voice bearer path is set up between the calling BSC and the called BSC for the calling MS and the called MS. The transparent transmission in the MGW is avoided. Thus, the transmission delay is reduced and the load of the MGW is mitigated.

Although the invention has been described through some embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the following claims or their equivalents. It is within the scope of the present invention to include all foreseeable equivalents to the elements and structure as described with reference to FIGS. 1-6.

What is claimed is:

1. A method for bearing voice data, comprising:
determining, by a calling Mobile Switching Center Emulation (MSCe) and a called MSCe, whether a calling Mobile Station (MS) and a called MS support a same voice coding and decoding type and that a call between the calling MS and the called MS is a point-to-point call;
if the calling MS and the called MS support the same voice coding and decoding type and that the call between the calling MS and the called MS is the point-to-point call;
sending, by the calling MSCe and the called MSCe, a Bearer Update Request to a calling Base Station Controller (BSC) and a called BSC respectively;
setting up, by the calling BSC and the called BSC, a voice bearer path between the calling MS and the called MS according to the Bearer Update Request from the calling MSCe and the called MSCe; and
wherein sending, by the calling MSCe and the called MSCe, the Bearer Update Request to the calling BSC and the called BSC respectively comprises:
sending, by the calling MSCe, to the calling BSC, a Bearer Update Request carrying IP address and UDP port number of the called BSC, and
sending, by the called MSCe, to the called BSC a Bearer Update Request carrying IP address and UDP port number of the calling BSC.

2. The method of claim 1, wherein the calling MSCe and the called MSCe are not the same, before the calling MSCe and the called MSCe determine whether the calling MS and the called MS support the same voice coding and decoding type and that the call is a point-to-point call, further comprising:
recording, by the calling MSCe, the voice coding and decoding types supported by the calling MS, and obtaining and recording the voice coding and decoding types supported by at least one of the called MS or a called MGW from the called MSCe;
recording, by the called MSCe, the voice coding and decoding types supported by the called MS, and obtaining and recording the voice coding and decoding types supported by the calling MS from the calling MSCe; and
determining by the calling MSCe and the called MSCe that the calling MS and the called MS support the same voice coding and decoding type, the determining step comprises:
analyzing, by the calling MSCe, the recorded voice coding and decoding types to determine that the calling MS and the called MS support the same voice coding and decoding type if both the calling MS and the called MGW or both the calling MS and the called MS support the same voice coding and decoding type; and
analyzing, by the called MSCe, the recorded voice coding and decoding types to determine that the calling MS and the called MS support the same voice coding and decoding type if both the calling MS and the called MS support the same voice coding and decoding type.

3. The method of claim 1, wherein the calling MSCe and the called MSCe are the same, before the calling MSCe and the called MSCe determine that the calling MS and the called MS support the same voice coding and decoding type and that the call is a point-to-point call, further comprising:
recording by the MSCe the voice coding and decoding type supported by both the calling MS and the called MS; and
determining by the calling MSCe and the called MSCe that the calling MS and the called MS support the same voice coding and decoding type, the determining step further comprises:
analyzing by the two MSCes the recorded voice coding and decoding types to determine that the calling MS and the called MS support the same voice coding and decoding type if both the calling MS and the called MS support the same voice coding and decoding type.

4. The method of claim 2, further comprising:
sending by the calling MSCe a message carrying the IP address and UDP port number of the calling BSC to the called MSCe in response to the calling MSCe determining that the calling MS and the called MS support the same voice coding and decoding type and that the call is a point-to-point call, before the calling MSCe sends a Bearer Update Request to the calling BSC;
if the called MSCe determines that the calling MS and the called MS support the same voice coding and decoding type and that the call is a point-to-point call, returning by the called MSCe a response message carrying the IP address and UDP port number of the called BSC to the calling MSCe; and
if the called MSCe determines that the calling MS and the called MS do not support the same voice coding or decoding type or that the call is not a point-to-point call, returning by the called MSCe a response message carrying the IP address and UDP port number of the called MGW to the calling MSCe.

5. The method of claim 1, further comprising:
sending, by the calling BSC, a Bearer Update Response to the calling MSCe and sending, by the called BSC, a Bearer Update Response to the called MSCe in response to the calling BSC and the called BSC set up a voice bearer path according to the messages from the calling MSCe and the called MSCe.

6. The method of claim 1, wherein the step of sending, by the calling MSCe and the called MSCe, a Bearer Update Request to the calling BSC and the called BSC, respectively, further comprises one step of:

(a) sending by the calling MSCe and the called MSCe a Bearer Update Request at the same time to the calling BSC and the called BSC, respectively;

(b) sending by the calling MSCe a Bearer Update Request to the calling BSC first and then sending by the called MSCe a Bearer Update Request to the called BSC; and (c) sending by the called MSCe a Bearer Update Request to the called BSC first and then sending by the calling MSCe a Bearer Update Request to the calling BSC.

7. The method of claim 2, wherein the calling BSC and the called BSC, joined by an IP connection in between, are not the same.

8. The method of claim 3, wherein the calling BSC and the called BSC, joined by an IP connection in between, are not the same.

9. The method of claim 2, wherein when the calling MS or the called MS performs an inter-BSC hard handoff, further comprising:

sending, by the MSCe corresponding to the MS that performs the hard handoff, to a target BSC a Handoff Request carrying the IP address and UDP port number of the BSC corresponding to another MS;

taking, by the target BSC, the IP address and UDP port number of the BSC corresponding to another MS in the Handoff Request as the destination IP address and UDP port number of the voice bearer path and sending to the MSCe the IP address and UDP port number of the target BSC; and sending, by the MSCe corresponding to the MS that performs the hard handoff, to the BSC corresponding to another MS a Bearer Update Request carrying the IP address and UDP port number of the target BSC and changing the destination IP address and port number of the voice bearer path of the BSC corresponding to another MS to the IP address and UDP port number of the target BSC.

10. The method of claim 3, wherein when the calling MS or the called MS performs an inter-BSC hard handoff, further comprising:

sending, by the MSCe corresponding to the MS that performs the hard handoff, to a target BSC a Handoff Request carrying the IP address and UDP port number of the BSC corresponding to another MS;

taking, by the target BSC, the IP address and UDP port number of the BSC corresponding to another MS in the Handoff Request as the destination IP address and UDP port number of the voice bearer path and sending to the MSCe the IP address and UDP port number of the target BSC; and sending, by the MSCe corresponding to the MS that performs the hard handoff, to the BSC corresponding to another MS a Bearer Update Request carrying the IP address and UDP port number of the target BSC and changing the destination IP address and port number of the voice bearer path of the BSC corresponding to another MS to the IP address and UDP port number of the target BSC.

11. A system for bearing voice data, comprising:
a calling Base Station Controller (BSC);
a calling Mobile Switching Center Emulation (MSCe);
a called BSC; and
a called MSCe, wherein:
the calling MSCe and the called MSCe are configured to judge whether a calling Mobile Station (MS) and a called MS support a same voice coding and decoding type and whether a call is a point-to-point call;

the calling MSCe is configured to send to the calling BSC a Bearer Update Request carrying IP address and UDP port number of the called BSC;

the called MSCe is configured to send to the called BSC a Bearer Update Request carrying IP address and UDP port number of the calling BSC; and the calling BSC and the called BSC are configured to set up a voice bearer path between the calling MS and called MS according to the Bearer Update Requests from the calling MSCe and the called MSCe.

12. The system of claim 11, wherein:
the calling BSC and the called BSC are further configured to send a Bearer Update Response to the calling MSCe and the called MSCe, respectively.

13. The system of claim 11, further comprising a Medium Gateway (MGW), wherein:
the MGW is configured to fulfill functions of tone playing and number receiving, and to play a call progress indication before a called MS answers a call; and
the BSC is further configured to hear the call progress indication before a called MS answers a call.

14. The system of claim 11, wherein:
the calling MSCe and the called MSCe are not the same;
the calling MSCe is further configured to exchange with the called MSCe information about the calling BSC and the called BSC; and
the called MSCe is further configured to exchange with the calling MSCe information about the calling BSC and the called BSC.

15. A Mobile Switching Center Emulation (MSCe), comprising a judgment module and a communication module, wherein:

the judgment module is configured to judge whether a calling Mobile Station (MS) and a called MS support the same voice coding and decoding type and whether a call is a point-to-point call, and to notify the communication module of a judgment result; and the communication module is configured to send a Bearer Update Request to a Base Station Controller (BSC) according to the notification from the judgment module, wherein when the MSCe is a calling MSCe, the calling MSCe sends to a calling BSC a Bearer Update Request carrying IP address and UDP port number of a called BSC; and when the MSCe is a called MSCe, the called MSCe sends to the called BSC a Bearer Update Request carrying IP address and UDP port number of the calling BSC.

16. The MSCe of claim 15, wherein the communication module is further configured to receive Bearer Update Responses from the BSC.

17. The MSCe of claim 15, further comprising a BSC information exchange module, wherein:
the BSC information exchange module is configured to exchange information about BSCs with another MSCe.

18. The method of claim 1, wherein the voice bearer path between the calling MS and the called MS comprises a path between the calling BSC and the called BSC but not through an MGW.

19. The system of claim 11, wherein the voice bearer path between the calling MS and the called MS comprises a path between the calling BSC and the called BSC but not through an MGW.

* * * * *